July 18, 1939.  F. C. BEST  2,166,747
SAFETY DEVICE
Filed Jan. 6, 1936
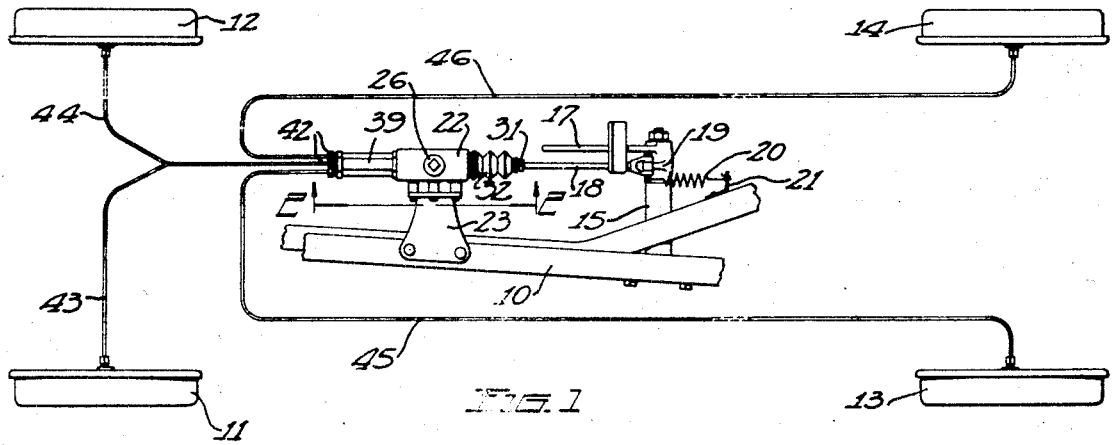
Fig. 1
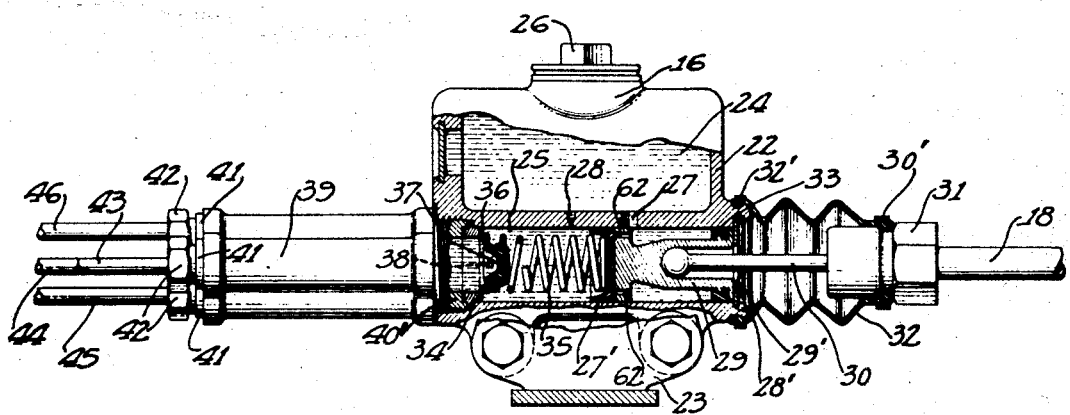
Fig. 2
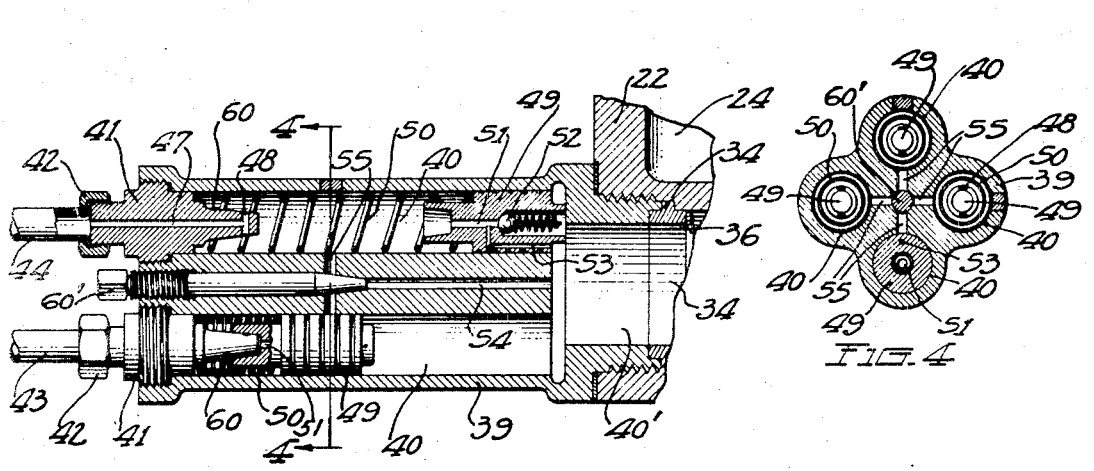
Fig. 3
Fig. 4
Inventor
FRANK C. BEST
By Tibbetts & Hart
Attorneys Patented July 18, 1939

2,166,747

UNITED STATES PATENT OFFICE 2,166,747

SAFETY DEVICE

Frank C. Best, Detroit, Mich., assignor to Packard Motor Car Company, Detroit, Mich., a corporation of Michigan Application January 6, 1936, Serial No. 57,696

7 Claims. (Cl. 303—84)

This invention relates to hydraulic brake systems and more particularly to systems of the type adapted for use on motor vehicles.

Hydraulic brake systems used on motor vehicles usually include a master power cylinder connected with a fluid reservoir and with a plurality of auxiliary power cylinders from which conduits lead to the several brake mechanisms. When there is a break in any one of these conduits or when there is leakage therefrom, fluid in the system will escape and in many instances the fluid drains off to an extent such that the system becomes ineffective to apply the brakes, and unsafe driving results.

An object of my invention is to provide a safe hydraulic brake system which will not become entirely ineffective due to leakage in some of the conduits leading to the brake applying mechanism.

Another object of my invention is to provide a hydraulic brake system with means whereby the individual conduits will be sealed off from the rest of the system when leakage therefrom develops.

A further object of the invention is to utilize the power pistons in the fluid cylinders leading to the conduits of a hydraulic brake system for shutting off communication between the conduits and the balance of the system when leakage develops in the conduits.

Another object of the invention is to provide power means for a plurality of hydraulic brake conduits having the parts thereof constructed so that they can be readily connected or disconnected for servicing.

Other objects of the invention will appear from the following description taken in connection with the drawing, which form a part of this specification, and in which:

Fig. 1 is a plan view, mainly diagrammatic, of a brake system incorporating my invention applied to a motor vehicle.

Fig. 2 is a side elevation, partly in section, of the power portion of the braking system illustrating the details of the master pressure means and the reservoir.

Fig. 3 is a fragmentary sectional view of the pressure portion of the fluid hydraulic braking system illustrating in detail the auxiliary power means connected with the fluid conduits.

Fig. 4 is a sectional view taken on line 4—4 of Fig. 3.

A hydraulic braking system disclosing the invention is shown associated with a motor vehicle having a frame 10, front wheel brakes 11 and 12 and rear wheel brakes 13 and 14. Pivotally mounted on a support 15 fixed to the frame is a brake pedal 17. A rod 18 is pivoted to boss 19 formed on the brake pedal hub and the brake pedal is normally held in its rearmost position by a coil spring 20 having one end fixed to the rod pivot and the other end fixed to a bracket 21 fixed to the vehicle frame.

The hydraulic brake system for the front and rear wheel brakes is carried by the frame. In such system there is a casing 22 bolted on a supporting bracket 23 fixed on the vehicle frame 10. This casing is preferably formed to provide a fluid reservoir 24 and a master or primary power cylinder 25. The casing is formed with a filler neck 16 which is closed by a screw cap 26 and the reservoir communicates with the interior of the primary power cylinder through means of ducts 27 and 28.

Arranged to reciprocate in the primary power cylinder is a piston 29 with which is associated a link 30 connected with the brake rod 18 by a suitable coupling 31. A boot 32 extends around the link 30 and is sealed around an extended end portion of the power cylinder extending from the casing 22 by a removable strap 32'. The other end of this boot is sealed around the coupling 31 by a removable strap 30'. A stop plate 29' is arranged in the rear end of the power cylinder and is secured therein by a detachable retainer spring 28'. The rear end of the piston is formed with a flange which is adapted to engage the stop plate 29' and fixed to the piston in advance of this rear flange is a gasket 33 arranged to engage with the cylinder and prevent escape of fluid rearwardly past the piston.

Engaging the forward end of the piston is another cup shaped gasket 27' and a spring 35 holds this gasket in such relation with the piston. In the forward end of the power cylinder is fitted a ring supporting member 34 against which a check valve structure is seated and held by the coil spring 35. This check valve structure consists of a rigid perforated cup member 36 carrying a rubber valve member 37 having a flanged portion overlying the perforations 38 therein. This rubber flange allows forward passage of fluid thereby but prohibits the flow of fluid through the perforated cup member in a direction rearwardly of the power cylinder. The duct 28 provides a connection whereby fluid can flow from the reservoir into the power cylinder and can flow between the power cylinder and the reservoir, and the duct 27 is provided for a purpose to be hereinafter described.

A unitary fluid dispensing means is carried in the casing 29 which is screwed into the forward end of the power cylinder and serves to hold the ring support 34 tightly in place. The spring 35 engages the cup member 36 to retain it against this ring support. Casing 39 is formed with four axially parallel auxiliary power chambers 40 which are open at their rear ends to a manifold 40' which screws into and is in open communication with the power cylinder. The forward ends of these auxiliary cylinders have fittings 41 screwed therein and fixed to such fittings by suitable couplings 42 are conduits 43, 44, 45 and 46. Conduits 43 and 44 lead respectively to the front wheel brakes 11 and 12 while conduits 45 and 46 lead respectively to the rear wheel brakes 13 and 14. Extending through the outer end of the fittings are axial passages 47 which terminate in a transversely extending passage 48 at the rear end. The rear end portions 60 of the fittings are circular in cross section and taper toward their inner ends and the passages 48 are arranged to open through such conical peripheries of the fittings.

Power means in the form of pistons 49 are carried in the auxiliary cylinders and are normally spaced from the fittings 41 by coil springs 50. These auxiliary pistons are formed with an axial passage 51 of different diameters establishing communication between the manifold 40' of the casing 39 and the auxiliary power cylinders. At the rear end of each of these passages is a spring pressed ball check valve 52. These valves allow fluid to flow rearwardly through passages 51 but prevent forward flow of fluid thereby. Each auxiliary piston is formed with a bypass 53, of relatively small cross section, which connects the passage 51 in advance of the valve 52 with the manifold 40' which is in open communication with the primary power cylinder.

The auxiliary cylinders are arranged in a circular relation and a passage 54 extends axially through the casing 39 and communicates with the manifold portion 40' thereof. Passages 55 connect this passage 54 with each of the auxiliary power cylinders and associated with the passage 54 is a valve 60' which is adapted to establish or shut off communication between the passage 54 and the passages 55.

The forward ends of the passages 51 in the auxiliary power pistons 49 are widened to telescope over and engage in a binding relation with the rear end portion 60 of the fittings 41 in a manner whereby the transverse passages 48 are completely sealed from the interior of the cylinder 40 and from communication with the passageway 51. To this end the overlapping faces of the end 60 and widened portions of passage 51 are slanted and conformed relative to each other to establish a binding or wedged relationship therebetween. Although this binding relation may extend throughout the telescoped portions of the faces, it is sufficient for the purposes of this invention that this binding relation be regionalized to the area circumferentially and axially adjacent to the openings on passageway 48 to thus provide means for automatically sealing off any one of the conduits, when broken or leaking, from the rest of the system. This frictional fit is of such a character that it will not be overcome by the action of the springs 50 and it is necessary to remove the fittings 41 in order to detach the auxiliary pistons therefrom. This detachment can be accomplished without entirely removing the auxiliary pistons from their cylinders but, if desired, suitable plug means can be inserted in the ends of the auxiliary cylinders if it is desired to remove the pistons for any reason.

When the braking system is installed on a motor vehicle it is substantially filled with fluid and at all times the reservoir should be maintained at least half full of fluid. In order to apply the brakes the pedal 17 is pressed forwardly to produce a forward movement of the main power piston through means of the rod 18 and link 30. This movement of the main power piston forces fluid from the main power cylinder through the check valve device at its forward end and into the manifold 40' of the casing 39 from which it is moved forwardly into the auxiliary cylinders forcing the auxiliary pistons forwardly. This forward movement of the auxiliary pistons forces the fluid in advance thereof through the fittings 41 and the associated conduits to the brake applying mechanisms. The return of the main power piston and the gasket 27' to released position is much faster than the return of the fluid through the lines into the master cylinder. A momentary vacuum is therefore created in the master cylinder and additional fluid is drawn into the system from the reservoir through drilled holes 62 in the front end of the power piston and past the lip of the gasket 27'. Any excess fluid in the main power cylinder is returned through the duct 28 into the reservoir, thus we have the main power cylinder full of fluid for every brake application. The duct 27 is of course always in open communication with the small diameter portion of the piston and with the openings 62. The escape of fluid from the conduits or auxiliary cylinders is replenished upon the pressure operation of the piston by the forcing of fluid from the manifold 40' through the bypasses 53, and when there is an oversupply of fluid in the conduits then it can move into the manifold through the bypasses 53 and past the check valves 52.

Let us assume now that there is serious leakage in one of the conduits or that one of the conduits has been broken. Under either of such conditions forward movement of the power piston will move the auxiliary pistons forwardly in this same manner as previously described, but as the broken or open conduit is exposed to atmosphere, the resistance to the auxiliary piston movement in the associated auxiliary chamber will be materially reduced and the pressure of the fluid behind such auxiliary piston will force it to telescope the conical end of the associated fitting and to frictionally engage thereon so that the associated spring 40 will not release it from such frictional engagement. As a consequence, the opening 48 is sealed off from its auxiliary cylinder and from the rest of the system. By sealing off the broken or leaking conduit, the fluid in the system will not escape therethrough and it will continue to function in an efficient manner. The motor vehicle will thus have operable effective brake mechanism even though one of the fluid conduits is broken. When this broken or leaking conduit is repaired, it is necessary to remove the associated fitting 41 in order to release the auxiliary piston therefrom whereupon the parts are reassembled in the auxiliary cylinder as previously described. After the fitting and piston have been separated and are in their normal position in the auxiliary cylinder then the valve 60' is opened to allow communication between the passage 54 which is open to the manifold 40' and the interior of the chamber which has been serviced in order that such chamber and its conduit will be quickly filled with fluid through a pumping action by the main power piston. After such conduit and auxiliary cylinder are filled with fluid then the valve 50' is again screwed down to close the passages 55.

It will be seen that I have provided means which permits the continued use of a disabled hydraulic brake system so that further driving can be done with safety.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a hydraulic system for applying vehicle brakes, the combination with a power cylinder having an outlet with an opening therein connected to a brake, a piston in the cylinder, and cap means on the piston for telescoping and sealing the cylinder outlet in frictionally binding relation while the outlet opening is exposed to atmosphere, said piston being moved by a brake applying operation of the system to place the cap means in sealing relation with the outlet.

2. In a hydraulic system for applying vehicle brakes having a main power cylinder, a pressure applying means in said cylinder, a plurality of separate auxiliary power cylinders having outlets, said cylinders communicating with the main cylinder, a piston in each auxiliary system, and conduit means leading from the auxiliary cylinder outlets to the brakes, of means for individually telescoping and frictionally sealing each conduit means from each auxiliary cylinder to seal the same when there is leakage therefrom comprising a movable element in each auxiliary cylinder responsive to pressure therein.

3. In a hydraulic system for applying vehicle brakes having a fluid cylinder and a piston in the cylinder, the combination of an outlet fitting for the cylinder having a passage therethrough, and means on the piston for engaging the fitting and in a frictionally binding relation sealing the passage from the cylinder when the passage is exposed to atmosphere.

4. In a hydraulic system for applying vehicle brakes having a fluid cylinder and a piston in the cylinder, the combination with an outlet fitting for the cylinder having an end projecting into the cylinder and a passage therethrough opening through the projection, and a flanged extension on the piston for frictionally telescoping said fitting end to seal the passage opening therethrough.

5. In a hydraulic system for applying vehicle brakes, the combination with a power cylinder outlet having an opening therein, of means telescoping and frictionally engaging said outlet to seal the opening therein when exposed to atmosphere, said means being moved into sealing relation by pressure in the cylinder.

6. In a hydraulic system for applying vehicle brakes having a fluid cylinder and a piston in the cylinder, an outlet fitting for the cylinder having a tapering end projecting into the cylinder with a passage therethrough having an outlet opening upon the face of said projecting end adjacent the end thereof, and a flanged extension on said piston for telescoping said projecting end, said flanged extension being conformed to establish a binding relation with said projecting end over a circumferential area which includes said opening in a sealing relation.

7. In a hydraulic braking system, a brake, a source of pressure fluid supply, a connection from said source to said brake, means for applying pressure to said brake from said source, a cylinder constituted as a part of said connection, a piston in said cylinder for precluding flow of pressure fluid through the cylinder, a spring for urging the piston in one direction, and a continuous wedge seat adjacent said spring, overbalanced pressure at the side of said piston opposite said spring being adapted to cause the piston to become graspingly held against said wedge seat.

FRANK C. BEST.